United States Patent
Gray et al.

(10) Patent No.: US 11,875,167 B2
(45) Date of Patent: *Jan. 16, 2024

(54) METHOD FOR DEPLOYING CONTAINERIZED PROTOCOLS ON VERY SMALL DEVICES

(71) Applicant: Nubix, Inc., Denver, CO (US)

(72) Inventors: Michael Gray, Denver, CO (US); Tom Yates, Denver, CO (US); Rachel Taylor, Denver, CO (US)

(73) Assignee: Nubix, Inc., Denver, CO (US)

( * ) Notice: Subject to any disclaimer, the term of this patent is extended or adjusted under 35 U.S.C. 154(b) by 305 days.

This patent is subject to a terminal disclaimer.

(21) Appl. No.: 17/209,100

(22) Filed: Mar. 22, 2021

(65) Prior Publication Data

US 2021/0294624 A1  Sep. 23, 2021

Related U.S. Application Data

(60) Provisional application No. 62/993,577, filed on Mar. 23, 2020.

(51) Int. Cl.
  *G06F 9/455* (2018.01)
  *G06F 8/654* (2018.01)
  (Continued)

(52) U.S. Cl.
  CPC .......... *G06F 9/45508* (2013.01); *G06F 8/654* (2018.02); *G06F 9/45516* (2013.01);
  (Continued)

(58) Field of Classification Search
  CPC .. G06F 9/45508; G06F 8/654; G06F 9/45516; G06F 9/45533; G06F 12/1425; G06F 12/1441; G06F 8/61
  See application file for complete search history.

(56) References Cited

U.S. PATENT DOCUMENTS 10,083,052 B1  9/2018  Venkatraman et al.
10,841,152 B1 * 11/2020  Humphreys ............ H04L 67/10
(Continued)

FOREIGN PATENT DOCUMENTS

WO  2018208409 A1  11/2018

OTHER PUBLICATIONS

International Search Report and Written Opinion for International Patent Application No. PCT/US2022/021435 dated Jul. 18, 2022; 11 pages.

(Continued)

*Primary Examiner* — Michael W Ayers
(74) *Attorney, Agent, or Firm* — Run8 Patent Group, LLC; Peter Miller; Brian T. Chew

(57) ABSTRACT

A method includes: accessing a set of hardware parameters characterizing an embedded device; identifying a set of supported container functions based on the set of hardware parameters; accessing a selection of container functions; identifying a set of selected container functions based on the selection of container functions and the set of supported container functions; generating a hardware abstraction layer (HAL) including a set of libraries supporting the set of selected container functions; generating a container runtime environment (CRE) configured to execute, at the embedded device, a containerized application via the HAL, the containerized application including the set of selected container functions; installing the HAL and the CRE onto the embedded device; installing the containerized application onto the embedded device via the CRE; and at the embedded device, executing the containerized application via the CRE and the HAL.

20 Claims, 4 Drawing Sheets

(51) Int. Cl.
*G06F 12/14* (2006.01)
*G06F 8/61* (2018.01)

(52) U.S. Cl.
CPC ...... *G06F 9/45533* (2013.01); *G06F 12/1425* (2013.01); *G06F 8/61* (2013.01); *G06F 12/1441* (2013.01)

(56) References Cited

U.S. PATENT DOCUMENTS

| | | | |
|---|---|---|---|
| 11,010,259 B1 | 5/2021 | Geng et al. | |
| 2006/0107087 A1 | 5/2006 | Sieroka et al. | |
| 2007/0143854 A1 | 6/2007 | Wasilewski | |
| 2008/0271035 A1 | 10/2008 | Yasukawa | |
| 2010/0107157 A1 | 4/2010 | Seo | |
| 2010/0292556 A1 | 11/2010 | Golden | |
| 2014/0019891 A1* | 1/2014 | Borah | G06F 8/30 715/762 |
| 2014/0165190 A1 | 6/2014 | Quigley et al. | |
| 2014/0359552 A1 | 12/2014 | Misra et al. | |
| 2016/0378518 A1* | 12/2016 | Antony | G06F 9/5077 718/1 |
| 2017/0060574 A1 | 3/2017 | Malladi et al. | |
| 2017/0083386 A1 | 3/2017 | Wing et al. | |
| 2017/0366616 A1* | 12/2017 | Rodrigues Nascimento | H04W 4/44 |
| 2018/0188989 A1 | 7/2018 | Nachimuthu et al. | |
| 2018/0218007 A1* | 8/2018 | Wells | H04L 67/1097 |
| 2018/0295485 A1 | 10/2018 | Jalkanen et al. | |
| 2018/0365036 A1* | 12/2018 | Toal | G06F 9/44578 |
| 2019/0042319 A1 | 2/2019 | Sood et al. | |
| 2019/0321725 A1* | 10/2019 | Zimring | A63F 13/40 |
| 2020/0065085 A1* | 2/2020 | Talbert | G06F 8/65 |
| 2020/0303060 A1* | 9/2020 | Haemel | G06N 3/082 |
| 2020/0319879 A1 | 10/2020 | Ghosh et al. | |
| 2020/0387361 A1 | 12/2020 | Modeel et al. | |
| 2021/0011823 A1 | 1/2021 | Bernat et al. | |
| 2021/0044646 A1 | 2/2021 | Bernat et al. | |
| 2021/0044648 A1 | 2/2021 | Lau et al. | |
| 2021/0097476 A1* | 4/2021 | Ding | G06F 9/45558 |
| 2021/0157927 A1 | 5/2021 | Beddus et al. | |
| 2022/0014566 A1 | 1/2022 | Bernat et al. | |
| 2022/0028200 A1 | 1/2022 | Keith, Jr. | |
| 2023/0047700 A1* | 2/2023 | Van Loon | G05B 19/4183 |

OTHER PUBLICATIONS

Joseph, "Learning Docker creating your own base image", 2019.
Non-Final Office Action for U.S. Appl. No. 17/673,732 dated Jul. 27, 2022.

* cited by examiner

METHOD FOR DEPLOYING CONTAINERIZED PROTOCOLS ON VERY SMALL DEVICES

CROSS-REFERENCE TO RELATED APPLICATIONS

This application claims the benefit of U.S. Provisional Application No. 62/993,577, filed on 23 Mar. 2020, which is incorporated in its entirety by this reference.

TECHNICAL FIELD

This invention relates generally to the field of embedded firmware applications and more specifically to new and useful systems and methods for deploying containerized applications on embedded devices in the field of embedded firmware applications.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
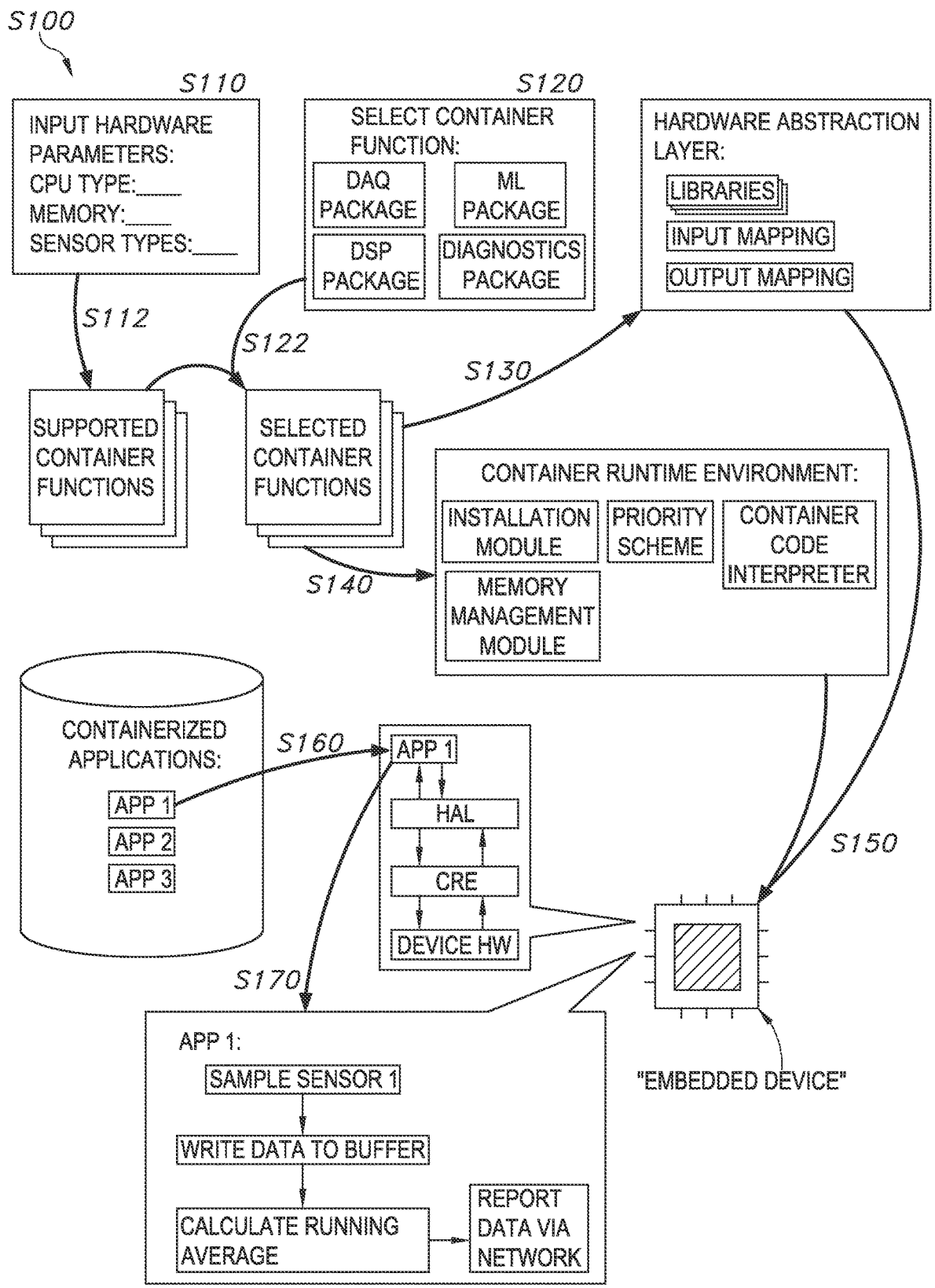
FIG. 1 is a flowchart representation of a method.

As shown in FIG. 1, a method S100 for deploying containerized applications to an embedded device includes: accessing a set of hardware parameters characterizing an embedded device in Block S110; identifying a set of supported container functions based on the set of hardware parameters in Block S112; accessing a selection of container functions in Block S120; identifying a set of selected container functions based on the selection of container functions and the set of supported container functions in Block S122; generating a hardware abstraction layer comprising a set of libraries supporting the set of selected container functions, an input mapping from the set of selected container functions to native instructions executable by the embedded device, and an output mapping from data structures generated by the embedded device to a generalized data structure in Block S130; generating a container runtime environment configured to execute, at the embedded device, a first containerized application via the hardware abstraction layer, the first containerized application comprising the set of selected container functions in Block S140; installing the hardware abstraction layer and the container runtime environment onto the embedded device in Block S150; installing the first containerized application onto the embedded device via the container runtime environment in Block S160; and, at the embedded device, executing the first containerized application via the container runtime environment and the hardware abstraction layer in Block S170.

Figure 2:
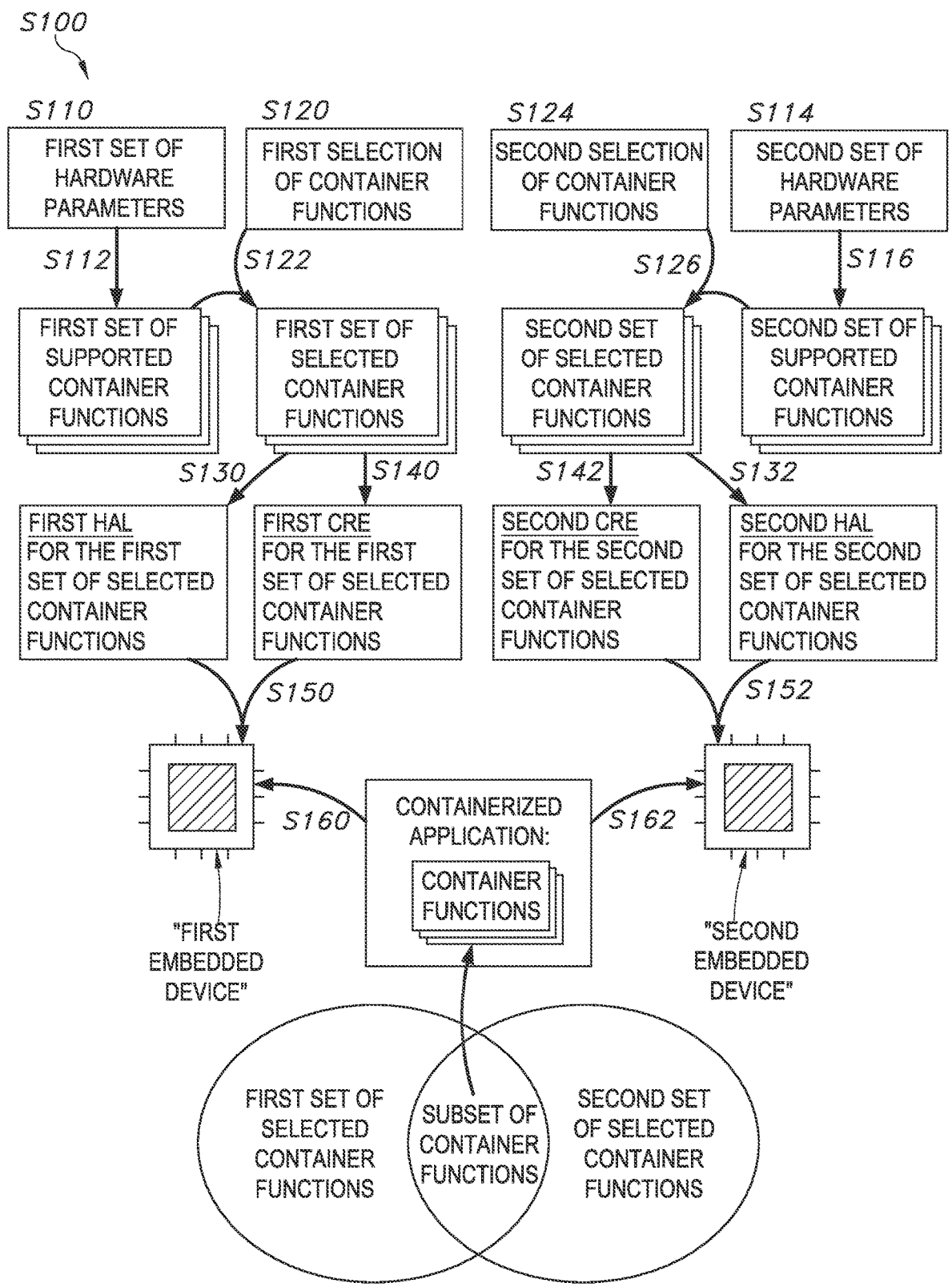
FIG. 2 is a flowchart representation of one variation of the method.

As shown in FIG. 2, one variation of the method S100 includes: accessing a first set of hardware parameters characterizing a first embedded device in Block S110; identifying a first set of supported container functions based on the first set of hardware parameters in Block S112; accessing a first selection of container functions in Block S120; identifying a first set of selected container functions based on the first selection of container functions and the first set of supported container functions in Block S122; generating a first hardware abstraction layer comprising a first set of libraries supporting the first set of selected container functions, a first input mapping from the first set of selected container functions to native instructions executable by the first embedded device and a first output mapping from data structures generated by the first embedded device to a generalized data structure in Block S130; generating a first container runtime environment configured to execute, at the first embedded device, the first set of selected container functions via the hardware abstraction layer in Block S140; installing the first hardware abstraction layer and the first container runtime environment onto the first embedded device in Block S150; accessing a second set of hardware parameters characterizing a second embedded device, the second set of hardware parameters different from the first set of hardware parameters in Block S114; identifying a second set of supported container functions based on the second set of hardware parameters in Block S116; accessing a second selection of container functions in Block S124; identifying a second set of selected container functions based on the second selection of container functions and the second set of supported container functions in Block S126; generating a second hardware abstraction layer comprising a second set of libraries supporting the second set of selected container functions, a second input mapping between the second set of selected container functions and native instructions executable by the second embedded device, and a second output mapping between data structures generated by the second embedded device and a generalized data structure in Block S132; generating a second container runtime environment configured to execute, at the second embedded device, the second set of selected container functions via the second hardware abstraction layer in Block S142; installing the second hardware abstraction layer and the second container runtime environment onto the second embedded device in Block S152; installing a first containerized application onto the first embedded device via the first containerized runtime environment, the first containerized application comprising a subset of container functions of the first set of selected container functions and of the second set of selected container functions in Block S160; and installing the first containerized application onto the second embedded device via the second containerized runtime environment in Block S162.

2. Embedded Device

Figure 3:
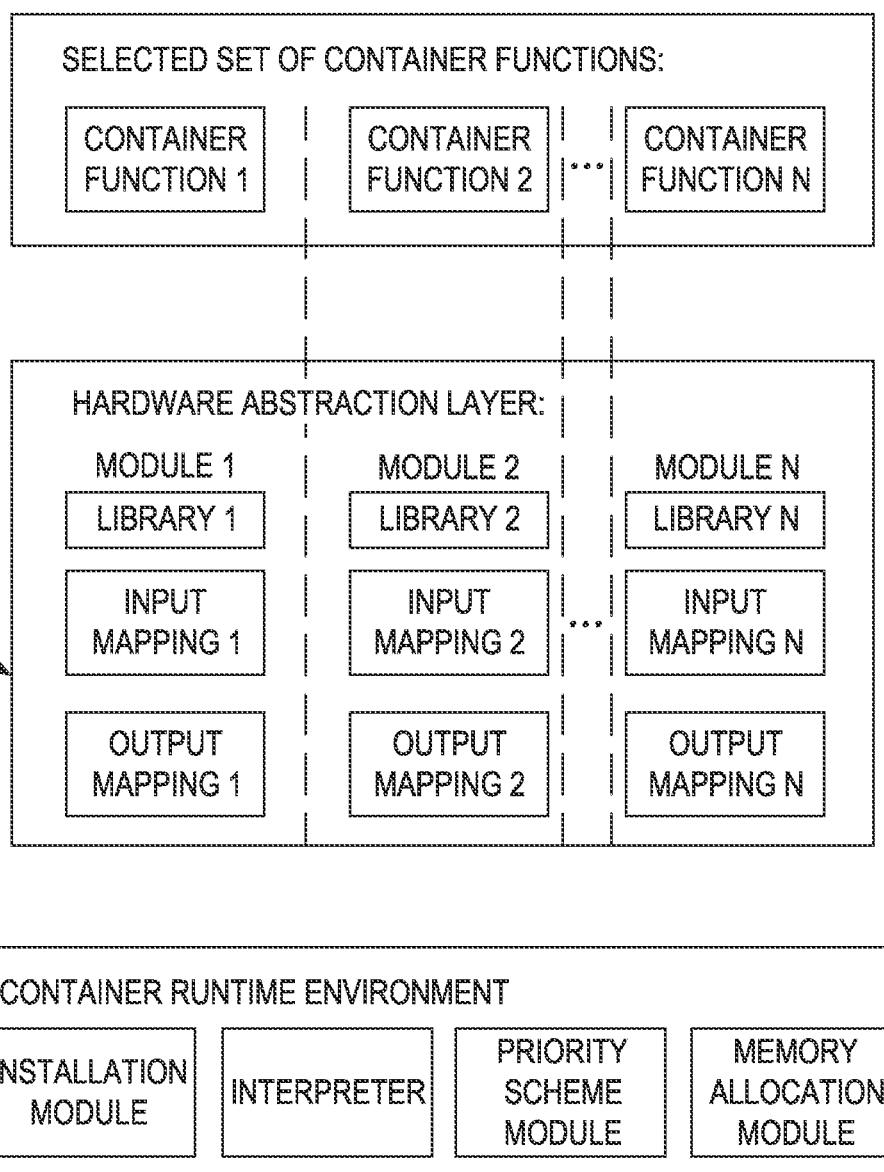
FIG. 3 is a flowchart representation of one variation of the method.

As shown in FIG. 3, the method S100 is executed in cooperation with an embedded device including a memory component and a central processing unit. The memory component stores a hardware abstraction layer and a container runtime environment. The hardware abstraction layer includes: a set of libraries supporting a set of selected container functions; an input mapping from the set of selected container functions to native instructions executable by the embedded device; and an output mapping from data structures generated by the embedded device to a generalized data structure. The container runtime environment is configured to execute a first containerized application via the hardware abstraction layer, the first containerized application including the set of selected container functions. The central processing unit is configured to install the first containerized application onto the embedded device via the container runtime environment; and execute the first containerized application via the container runtime environment and the hardware abstraction layer.

3. Applications

Increasingly, embedded devices (i.e., IoT devices, edge devices, very small devices)—such as pressure and pump rate sensors in oil wells or temperature and humidity sensors in home and industrial applications—utilize low-compute low-memory microcontrollers that coordinate sampling and transmission of data to data centers and/or gateway servers according to the firmware of each embedded device. Generally, firmware that enables sampling, processing, and communication of data can vary significantly across different types of sensors and different classes of embedded devices and is developed, on an ad hoc basis, which results in difficult deployment and management of new or updated firmware across a fleet of embedded devices.

Generally, the method S100 is executed by a system, such as a computational device or a set of computer servers, in order to install containerized applications on one or more embedded devices characterized by low-computing and low-memory resources. More specifically, the system can: generate application- and hardware-specific container runtime environments (hereinafter "CREs") and hardware abstraction layers (hereinafter "HALs") configured to install and run containerized applications; install these CREs and HALs on corresponding embedded devices; and install containerized applications that execute within the CRE and via the HAL. Thus, by instantiating a consistent CRE across many disparate embedded devices, the system: enables a unified development system for embedded developers with which to create containerized applications compatible across many categories of embedded devices (e.g., using higher-level or interpreted programming languages); reduces overhead and downtime for firmware/software updates to embedded devices; and enables fleet-level control of large deployments of embedded devices executing the same containerized applications within multiple instances of the CRE.

Additionally, the system enables reconfigurable compute capabilities at embedded devices (e.g., microcontrollers) with limited on-board memory and processing bandwidth, via automatic generation of modular CREs and HALs configured to execute containerized applications on specific hardware and containerized applications including a user-selected set of container functions. Thus, the system can minimize the memory footprint (e.g., to less than 256 kilobytes) of each instance of the CRE and HAL on very small microcontrollers by customizing each of these instances to the particular hardware and particular application specific to an intended deployment.

More specifically, the system can: access a set of hardware parameters of an embedded device; access a selection of container functions entered by a user; and generate a CRE and HAL capable of executing the selected container functions (when included in containerized applications) with the hardware present at the embedded device. Once the system has generated a compatible CRE and HAL, the system can install the CRE and HAL alongside an operating system (e.g., a real-time operating system) of the embedded device or replace the existing firmware of the embedded device with the CRE and HAL via a one-time firmware update or during device manufacturing, thereby enabling execution of containerized applications (e.g., data sampling, data processing, and/or data output applications) that do not need to be specifically designed and/or reconfigured for compatibility across different types of sensors or types of devices. Once the system installs the CRE and HAL onto an embedded device, the system can install updates to containerized applications and/or install new containers on the embedded device (e.g., remotely, manually) without updates to its firmware, thereby enabling agile reconfiguration of compute capabilities and/or deployment of new compute capabilities at the device edge without the risks or potential security and or stability vulnerabilities presented by firmware updates.

Furthermore, the system can deploy a set of such containerized applications across large numbers of networked or non-networked devices cooperating with different types of and/or classes of sensors (e.g., hundreds of devices at hundreds of sensors, thousands of devices at thousands of sensors), thereby enabling the user to: read and aggregate data output by a large set of diverse sensors; deploy tools and/or applications (e.g., within the system) for real-time analysis of and/or insights based on this data; orchestrate local compute capabilities between sensors on these embedded devices; and rapidly detect and correct problems within systems monitored by these sensors. Because new containers and/or updates to existing containers can be installed remotely without firmware updates, the system further enables the user to rapidly install and test new and/or updated data sampling and analysis applications in the field and easily and quickly remove outdated or less functional software.

The methods are described herein as being executed by a system (e.g., a web-based development system, a locally-connected orchestration system) in conjunction with a set of embedded devices deployed in commercial or industrial applications. However, these methods can also be implemented by a local computer network, a distributed computing network, a cloud computing system, or any other suitable architecture in order to implement containerized compute capabilities on devices and streamline aggregation and analysis of data output by sensors cooperating with these devices.

4. Examples

In one example, the system can simultaneously install multiple versions of a containerized application onto corresponding sets of embedded devices, thereby enabling A/B testing of the containerized application. In particular, during operation, the system can: install a first version of a containerized application on a first set of devices to generate a first dataset; and concurrently install a second version of the containerized application (e.g., a set of new or updated containerized applications) on a second set of devices to generate a second dataset; analyze the first dataset to generate a first result; and analyze the second dataset to obtain a second result. Thus, the system enables the user to easily and quickly compare results derived (e.g., concurrently derived, independently derived) from multiple different versions of a containerized application and select a desired version of the container application based on these results. The system can then retain a set of containerized applications corresponding to the desired version of the containerized application and uninstall the other version of the containerized application from the device according to user instructions. Alternatively, the system can automatically replace containerized applications corresponding to a first version of the containerized application with updated containerized applications corresponding to a second implementation in response to verifying that the second implementation outperforms the first implementation and is stable over a particular period of time.

For example, if the system leverages data output by containerized applications deployed across a set of devices in a machine learning model, the system enables the user to determine an appropriate quantization for data sampling, analysis, and output within these containerized applications in order to conserve memory and/or computing resources on corresponding devices. In particular, the system can: generate a first set of containerized applications including data sampling, data processing, and data output instructions at a first quantization; generate a second set of containerized applications including the data sampling, data processing, and data output instructions at a second quantization; and install the first set of containerized applications and the second set of containerized applications on a set of devices. During operation, the system can then: coordinate concurrent and/or sequential execution of the first set of containerized applications and the second set of containerized applications; apply outputs from the first set of containerized applications at the first quantization in a first instance of a machine learning model; and apply outputs from the second set of containerized applications in a second instance of the machine learning model, thereby enabling the user to compare results of the model and/or insights based on the model at each quantization, identify a desired quantization based on these results, memory considerations, etc., and select a corresponding set of containers to retain on and/or uninstall from the set of devices.

In another implementation, the system can configure a containerized application or a set of containerized applications to be deleted (e.g., uninstalled) from a device by the CRE after being executed a predetermined number of times (e.g., once, three times, ten times). For example, in order to determine whether a particular product needs to be recalled or serviced, the system can: generate a one-time (e.g., single use) containerized application configured to sample and output data from a particular set of sensors within the product; install (e.g., remotely install) the one-time containerized application on a set of devices connected to the set of sensors; detect presence (or absence) of a defect in the product based on the output of the single-use containerized application; and subsequently cooperate with a CRE on the set of devices to delete, uninstall, or otherwise destroy the single-use containerized application, thereby enabling fully remote defect detection without limiting memory available on the set of devices for other, long-term functionalities.

5. Hardware Parameters

Generally, in order to generate a hardware-specific CRE and HAL for an embedded device, the system can access a set of hardware parameters characterizing an embedded device in Blocks S110 and S114. More specifically, the system can access hardware parameters such as: a central processing unit type of the embedded device (e.g., word size, instruction set, number of cores); an available memory of the embedded device (e.g., in KB); a memory type of the embedded device (e.g., EEPROM, flash memory, SRAM, DRAM, DDRSRAM, GPIO external memory); a bus type (e.g., I2C, MODBUS, CAN bus); a sensor type associated with the embedded device (e.g., pressure sensors, accelerometers, temperature sensors); a hardware accelerator type of the embedded device; and a network connectivity of the embedded device (e.g., Ethernet, WiFi, LoraWAN, cellular). Thus, the system can fully characterize the components and capabilities of the embedded device in order to identify modular components of the CRE and the HAL that are compatible with the embedded device.

In particular the system can identify a set of supported container functions (higher-level programming functions) that are supported by the hardware of the embedded device and the sensors associated with the embedded device based on the set of hardware parameters characterizing the embedded device in Blocks S112 and S116. Each container function in the set of supported container functions is associated with a modular program for inclusion in the CRE and the HAL that enables a compatible embedded device to execute the supported container function. For example, the system can define a container function for receiving digital thermometer data over an I2C bus, which is associated with modular program enabling hardware abstraction of the I2C bus relative to a containerized application and execution of the data read from the I2C bus via the CRE. Thus, the system can identify a subset of container functions that can be executed on the embedded device based on the set of hardware parameters characterizing the embedded device.

6. Container Function Selection

Once the system has identified a subset of supported container functions based on the set of hardware parameters characterizing the embedded device, the system can access a selection (e.g., a user selection) of container functions in Blocks S120 and S124. Upon accessing the selection of container functions, the system can identify a set of selected container functions based on the selection of container functions and the set of supported container functions in Blocks S122 and S126. Thus, the system identifies a set of container functions for which to generate the CRE and HAL based on an intersection between container functions selected by the user and container functions supported by the hardware of the embedded device.

For example, the system can access a selection of container functions including a first container function for data extraction from a first sensor type (e.g., a BME 280 temperature and humidity sensor) and a first set of related data processing container functions. The system can then generate (as is further described below) a first CRE and a first HAL configured to execute the set of container functions in conjunction with a sensor of the first type. Subsequently and/or concurrently, the system can access a selection of container functions including a second container function for data extraction from a second sensor type (e.g., a BME 680 temperature and humidity sensor) and a second set of related data processing container functions. The system can then generate a second CRE and a second HAL that is configured to execute the second set of container functions in conjunction with a sensor of the second type. The system can therefore leverage application-specific CREs and hardware-specific HALs to provide computing environments for specific sensor types responsive to selection of a sensor type by a user, thereby enabling execution of similar or identical containerized applications on different types of sensors (e.g., executed by the same container runtime environment) with little or no reconfiguration of these applications (e.g., by a user) between different types of sensors.

In one implementation, the system can receive a selection of container functions from a graphical user interface associated with the system. In this implementation, the system can render, at the graphical user interface (e.g., via a browser or locally executing application), a set of action icons representing each container function in the set of container functions. The user may then click or otherwise select action icons representing the selected set of container functions.

In another implementation, the system can group or otherwise bundle related sets of container functions in order to facilitate selection of a complete set of container functions relevant to a desired application of the embedded device. For example, the system can group a convolutional layer function, a pooling layer function, and a fully-connected layer function within a group of machine learning container functions. In another example, the system can group a lowpass filter function, a bandpass filter function, and a fast-Fourier transform function within a group of digital signal processing functions. Thus, a user may select more than one container function at a time by selecting a group of container functions that pertains to a desired use-case of the embedded device.

7. Containerized Applications

Generally, the system can cooperate with an integrated development environment (hereinafter an "IDE") to enable users to design containerized applications for execution by instances of the CRE and HAL deployed across a set of embedded devices. For example, the system can communicate the set of selected container functions to the IDE, and the IDE can restrict the user to the set of selected container functions as the user develops a containerized application. Thus, the system ensures that the resulting containerized application is executable by the embedded devices selected by the user and for the applications selected by the user.

More specifically, a containerized application defines a software unit (e.g., a set of functions, software module) with a very small memory (e.g., <256 KB) and CPU footprint configured for execution by instances of the CRE and HAL installed on an embedded device. As described in more detail below, the CRE includes application-specific modules configured to execute the set of selected container functions included within these container applications. Therefore, each containerized application can be deployed (e.g., installed, pushed) to local memory of embedded devices, such as 32-bit RISC devices.

The system, in cooperation with the IDE, enables users to write containerized applications in an interpreted programming language, such as Lua. The system can generate instances of the CRE including interpreters for supported languages in order to execute each containerized application on the embedded device. Thus, similar or identical containerized applications written in higher-level interpreted programming languages can be deployed to sample, process, and output data from multiple different types of sensor types and/or at multiple different types of devices, thereby reducing the complexity required to orchestrate (e.g., coordinate) these processes across a large set of embedded devices.

In one implementation, the system can compile a container application as bytecode in order to decrease the memory footprint of the container application when stored on the embedded device. More specifically, the system can generate a CRE configured to execute, at the embedded device, a containerized application via the hardware abstraction layer, wherein the containerized application: includes the set of selected container functions; and is represented as a compiled bytecode file. The embedded device can then execute the containerized application via the CRE and the HAL by: interpreting the first compiled bytecode file via the container runtime environment to convert the compiled bytecode file to a set of instructions executable on the embedded device; and executing the first set of instructions. Thus, the system can generate a CRE that includes a bytecode interpreter in order to accommodate a wide range of programming languages and to minimize the memory footprint of each containerized application.

Therefore, the system enables highly generalizable compute capabilities at the device edge across a wide range of sensor and/or device types. As described in further detail below, containerized applications and/or CREs can be rapidly and easily reconfigured to change these compute capabilities or deploy new compute capabilities according to user specifications within the system and/or by more advanced analytics applications executed by the system (e.g., at the gateway server).

The system can deploy a set of such containerized applications for execution or implementation across large sets of networked or non-networked devices (e.g., hundreds of devices at hundreds of sensors, thousands of devices at thousands of sensors), enabling simultaneous output of similarly structured data from a large set of sensors to a common gateway node (e.g., fog edge), real-time analysis of data captured by large sets of sensors (e.g., connected), real-time insights based on this analysis (e.g., based on unsupervised machine learning models), and/or rapid detection and correction of problems in systems monitored by these sensors.

8. Hardware Abstraction Layer

Generally, as shown in FIG. 3, upon identifying the set of selected container functions, the system can generate a hardware abstraction layer configured to map the set of selected container functions to the specific hardware of the embedded device. More specifically, the system can generate a hardware abstraction layer comprising a set of libraries supporting the set of selected container functions, an input mapping from the set of selected container functions to native instructions executable by the embedded device, and an output mapping from data structures generated by the embedded device to a generalized data structure in Blocks S130 and S132. Thus, by including an input mapping, an output mapping, and a set of libraries specifically for the set of selected container functions (and not including mappings and libraries for container functions excluded from the set of selected container functions), the system can reduce the memory footprint of the HAL on the embedded device.

Additionally, the system generates a HAL included in and/or paired with a particular CRE. In particular, the HAL includes: libraries for a set of bus standards (e.g., I2C, Fieldbus, Modbus, CAN bus); and output mappings configured to convert native data structures output by each type of supported sensor (e.g., a 32-bit unsigned integer, a 64-bit signed integer) to a consistent, generalized self-describing data structure that can be provided as an input to a containerized application and/or output by the embedded device (e.g., to a gateway server). The HAL and CRE therefore enable the device to execute containerized applications for data sampling, data processing, and data applications that maintain dependencies across multiple different classes and/or types of sensors and are thus independent of device and sensor type, thereby eliminating a need for data sampling and/or data processing logic in the underlying CRE.

In one implementation, each container function supported by the system is associated with a corresponding HAL module including an input mapping specific to the container function. Therefore, upon accessing a set of selected container functions, the system can: identify a corresponding set of HAL modules; and assemble the corresponding set of HAL modules into an application-specific HAL. For example, for a container function configured to extract a data entry from a specific sensor type via an I2C bus, the system can define a HAL module including an I2C bus library (identifying subroutines and native code for operating the I2C bus), an input mapping converting functions calls of the container function to a set of instructions executable by the specific hardware of the embedded device, and an output mapping between the I2C bus format and the generalized self-describing data structure of the CRE. Thus, the system can lookup specific HAL modules corresponding to the set of selected container functions in order to generate the HAL for an embedded device.

Furthermore, in one example, each HAL module corresponding to a particular container function includes a HAL submodule for each hardware variation supported by the system. For example, the system can define a separate HAL module corresponding to a container function, a first HAL submodule for microprocessors characterized by a 64-bit word size, and a second HAL submodule for microprocessors characterized by a 32-bit word size. Likewise, the system can define HAL submodules for specific hardware accelerators, bus types, etc. In this implementation, the system can select specific HAL submodules within the HAL modules corresponding to the set of selected container functions based on the set of hardware parameters.

9. Container Runtime Environment

Generally, as shown in FIG. 3, the system can generate a CRE configured to execute, at the embedded device, a containerized application via the HAL, the containerized application including the set of selected container functions in Blocks S140 and S142. More specifically, the system can generate a CRE that includes specialized system software that: controls hardware processes on the device such as querying a sensor over a particular communication bus; controls and executes containerized application on the device such as containerized data sampling applications, containerized data processing applications, and containerized data output applications; and/or controls the amount of CPU and memory on the device to which these processes have access. Thus, the system generates CREs including hardware- and application-specific code configured to execute multiple containerized applications on the embedded device.

The system is configured to generate a CRE that is compatible with a device and/or a sensor types specified by a user (i.e., via the set of hardware parameters). More specifically, the system can generate a CRE that is compatible with a particular device based on the device's CPU, the amount of memory on the device, the type of memory on the device, and any additional hardware on the device (a floating-point accelerator or any other hardware accelerators). The system can then install the CRE on local memory within the device, either during device manufacturing or during a one-time firmware update, as is further described below.

Furthermore, the system can generate a CRE that is configured to cooperate with the HAL by converting outputs from multiple different types and/or classes of sensors into self-describing data structure with a consistent structure, variable names, etc. that are then output by the embedded device to a gateway server connected to the system in real time and/or at a specified sampling frequency.

In one implementation, the system can define CRE modules associated with the previously described HAL modules and corresponding to particular container functions. In this implementation, each CRE module includes a code module configured to execute the corresponding container function on hardware specified by the set of hardware parameters. For example, the system can define a CRE module for efficiently executing matrix multiplication on a specific GPU included in the embedded device. Thus, while generating the HAL and the CRE, the system can select cooperating CRE modules and HAL modules in order to generate a CRE compatible with the HAL and the embedded device.

In another implementation, the system can generate a CRE including an installation module configured to install and/or update containerized applications available over a network or a wired connection. Generally, the installation module can allocate a storage memory region for the new containerized application, allocate a protected memory region for storing variables and/or data generated by the new containerized application, assign a priority to the new containerized application, and write the content (e.g., bytecode) of the new containerized application within the storage memory region for the new containerized application. Thus, the installation module can securely (without risk of bricking the embedded device) install new containerized applications onto the embedded device and, thereby, provide additional functions to the embedded device. Additionally, the embedded device via the installation module of the CRE, can update (e.g., replace an existing containerized application with a new version of the containerized application) via the installation module.

In yet another implementation, the system can generate a CRE configured to execute a stack machine in order to execute the set of containerized applications installed on the embedded device. In this implementation, the CRE can initially establish a memory region or set of registers of the CPU to utilize as a stack for instructions derived from the set of containerized applications. Thus, by utilizing a stack machine to execute instructions from the set of containerized applications, the CRE can minimize its memory footprint on the embedded device.

In yet another implementation, the system can generate a CRE including an interpreter (e.g., a bytecode interpreter) configured to interpret the code of each containerized application and generate instructions for the hardware of the embedded device via the HAL. Thus, the system can transform interpreted code contained within each containerized application and generate machine-readable instructions for execution by the embedded device.

9.1 Design Considerations: Memory Allocation

Generally, embedded devices such as 32-bit RISC devices include extremely limited on-board memory (e.g., 32-256 KB). More specifically, the system can generate a HAL and a CRE characterized by a memory footprint of less than 256 KB on the embedded device. Therefore, the system can automatically generate a CRE and HAL that is customized to the hardware of the embedded device (as defined by the set of hardware parameters), the set of selected container functions, and/or particular sensor types but excludes unneeded and/or unspecified functionalities, thereby reducing the size (e.g., memory footprint) of the CRE and permitting larger, containerized applications (e.g., containers with additional and/or more complex container functions and/or storage requirements) to be stored on and executed by the device.

For example, the system can: generate a first CRE that supports a first set of container functions in response to selection (e.g., by a user) of a first type of device; and generate a second CRE that supports a subset of these container functions in response to selection of a second type of device with fewer on-board capabilities than the first type of device. For example, the system can generate a first CRE configured for an ARM Cortex™ M-4 device (which includes a floating-point processor) that includes floating-point capabilities, but automatically exclude these floating-point capabilities from a second CRE configured for an ARM Cortex™ M-3 device (which does not include a floating-point processor). Thus, the second CRE (e.g., compatible with the Cortex™ M-3) can sample and process data from a particular sensor similarly or identically to the first CRE with a smaller memory and/or CPU footprint.

Additionally and/or alternatively, the system can enable (e.g., prompt) the user to select desired features of the CRE and/or a corresponding HAL based on the types of sensors connected to the device. For example, the system can generate a CRE including hardware abstraction tools configured to query a sensor over a subset of supported communication buses in response to user selection of particular communication buses (e.g., recommended by the system). For example, a user may opt to include support for only the Modbus applications in a HAL for a particular class of sensor. Alternatively, the user may opt to include support for both Modbus and Canbus in the HAL in order to achieve more generalized CREs that are compatible with other models or future models of that type of sensor.

Thus, the system can automatically balance and/or enable the user to balance the supported container functions of the CRE (and therefore its adaptability) and the inclusivity of the HAL against memory constraints of the embedded device. Furthermore, the system can generate multiple CREs and HALs that support different amounts and/or types of functionality, and select a CRE based on tests performed in software and/or tests performed in the field.

9.2 Design Considerations: Security

In one implementation, the system can generate CREs and/or HALs such that these tools have limited access to certain memory addresses and/or components on the embedded device. For example, the system can generate a CRE with restricted access to certain hardware and/or memory addresses reserved for the existing firmware of the embedded device while enabling access to processes and components that are essential to execute specific containerized applications, and/or as requested by the user. Thus, the system can reduce the attack surface presented by installation of the CRE to the device and by updates to an installed CRE, thereby reducing potential security vulnerabilities.

Additionally and/or alternatively, the system can generate a CRE that requires verification and/or presentation of a particular digital signature (e.g., digital certificate) prior to installing new containerized applications and/or updates to containerized applications for installation on the device. The system can then embed (e.g., include) the digital signature in all generated containerized applications, and/or subsequent updates to the CRE, thereby enabling the device to verify the source of this software and delete and/or reject containerized applications that do not include the correct digital signature. Additionally and/or alternatively, the system can encrypt new containerized application and/or updates to containerized application according to a public key verification by the CRE.

Furthermore, the system enables deployment of CREs and/or deployment of containerized applications configured to execute data analysis across a large set of devices (e.g., hundreds of devices, thousands of devices) that are not connected to the internet or to each other. For example, the set of devices may be connected to a common local gateway server (e.g., gateway node) over an encrypted, airgapped local network. Additionally and/or alternatively, containerized application updates, new containerized applications and/or updates to CREs can be deployed and/or installed manually to these devices in the field (e.g., flashed to the device from an SD card) in order to reduce or eliminate any security vulnerabilities associated with these updates.

10. Installation: CRE and HAL

Generally, prior to installing any containerized applications onto the embedded device, the system can install the HAL and the CRE onto the embedded device in Blocks S150 and S152. Thus, the system can first enable a containerized environment on the embedded device prior to installing specific containerized applications, thereby ensuring correct installation and management of these containerized applications by the embedded device.

Figure 4:
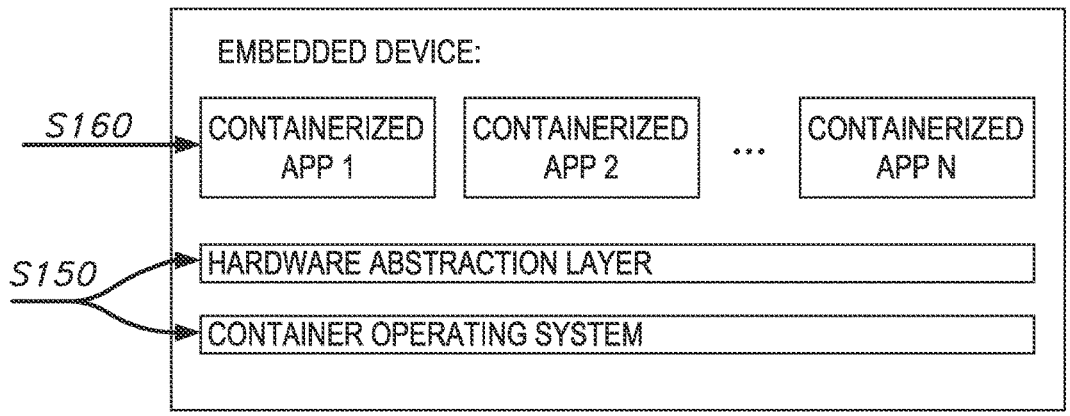
FIG. 4 is a flowchart representation of one variation of the method.

In one implementation, the system generates CREs configured to replace existing firmware on an embedded device and, therefore, also act as the operating system of the embedded device. In this implementation, as shown in FIG. 4, the system can install the CRE and HAL onto the embedded device via a one-time firmware update (e.g., during manufacturing or initial deployment of the embedded device or via standard firmware update procedures when the embedded device is already deployed in the field). More specifically, the system can: execute a firmware update on the embedded device to install a container operating system configured to execute the CRE on the embedded device; allocate a protected memory region on the embedded device via the CRE; and store the set of libraries, the input mapping, and the output mapping in the protected memory region. Thus, the system can install the CRE and the HAL on the embedded device and protect memory regions reserved for the CRE and HAL from containerized applications executing on the embedded device, thereby executing memory management (even on devices without built in memory management capabilities).

Figure 5:
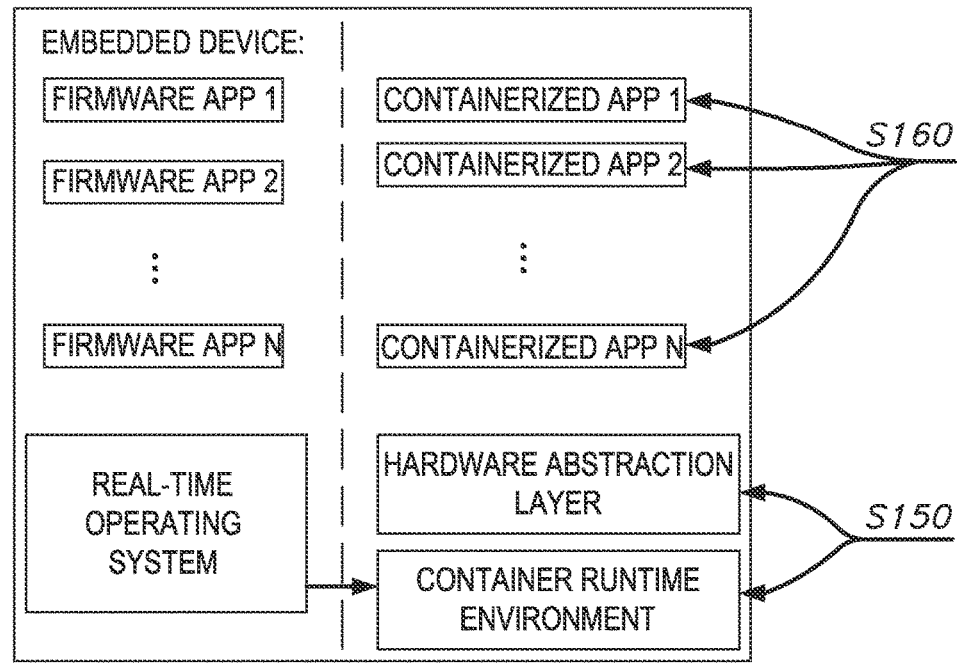
FIG. 5 is a flowchart representation of one variation of the method.

In another implementation, the system can install the CRE and the HAL alongside the native operating system (e.g., a real-time operating system) in order to preserve specific real-time functions of the embedded device. For example, the embedded device may be configured to sample from a sensor at a frequency guaranteed by the real-time operating system. Therefore, by installing the CRE and HAL alongside the real-time operating system (instead of in replacement of the real-time operating system), the system can maintain some essential functions of the embedded device while enabling installation of containerized applications (e.g., for data processing and communication) on the embedded device. More specifically, as shown in FIG. 5, the system can: execute a firmware update on the embedded device to install the CRE as native code executing on a real-time operating system of the embedded device; and store the set of libraries, the input mapping, and the output mapping in a protected memory region allocated to the CRE by the real-time operating system. Thus, in this implementation, the CRE and HAL execute as an application running on the native operating system of the embedded device.

In yet another implementation, the system can install the CRE and the HAL on an embedded device or a set of embedded devices during manufacture of these embedded devices. For example, the system can install a CRE and a HAL compatible with the particular device type directly onto local memory of the device (in EEPROM or another type of ROM) during manufacturing and/or included in the device's base firmware. The system can then connect to or cooperate with a device at approximately the same time that the device is deployed in the field (e.g., connected to or integrated with a sensor). The system can then rapidly install (e.g., remotely install) containers, CREs, hardware abstraction tools and any necessary updates to the CRE (e.g., in response to user instructions) without updating the device's firmware to include these containerized applications.

In yet another implementation, the system can install the CRE and the HAL onto local memory of an embedded device or set of embedded devices that are already deployed in the field. More specifically, container operating systems can be installed over a one-time firmware update, even to a range of device types that may cooperate with a number of different types and/or classes of sensors. For example, a particular site (e.g., a fracture well) may include a set of hundreds and/or thousands of existing (e.g., previously deployed) sensors of different classes and types (e.g., pressure sensors, concentration sensors, injection rate sensors, temperature sensors). Furthermore, sensors with existing compute capabilities may compute on different types of devices (e.g., A-class devices, M-class devices) according to different firmware that has little to no continuity across different types of devices and/or sensors, and a subset of these sensors may not have any compute capabilities at all. The system is therefore configured to generate a set of CREs and HALs compatible with each combination of device type and sensor type according to user specifications, which can be integrated into and/or replace existing firmware on these devices. The set of CREs and/or container operating systems can then be installed (e.g., manually installed, remotely installed) to corresponding devices in order to update and/or replace existing firmware on these devices and connect (e.g., pair) each device to the system. Additionally, a user (e.g., a field engineer) can also deploy new devices with a pre-installed container operating system to previously non-networked sensors (e.g., sensors without compute capabilities) and pair these devices to the sensors in order to connect the sensors to the system.

11. Installation: Containerized Application

Once appropriate CREs and HALs have been installed, the system can deploy (e.g., install) containerized applications to each embedded device to enable a variety of new capabilities for the embedded device in Block S160. Furthermore, the system can rapidly install (e.g., remotely install) containerized application updates and/or new containerized applications, (e.g., in response to user instructions) in order to rapidly reconfigure compute capabilities on these embedded devices or provide new compute capabilities to these embedded devices without updating firmware, thereby enabling the user to deploy and/or test new containerized application while avoiding the inherent risks associated with firmware updates as well as potential security vulnerabilities associated with leaving outdated and/or flawed firmware in the field.

The system can install a containerized application via any CRE installed on an embedded device configured to execute the container functions included in the containerized application. For example, the system can generate a first CRE based on a first set of selected container functions and install this first CRE on a first embedded device. Concurrently, the system can generate a second CRE based on a second set of selected container functions and install this second CRE on a second embedded device. In this example, the system can install a first containerized application on both embedded devices if the first containerized application includes a container functions that are included in both the first set of selected container functions and the second set of selected container functions. However, for example, if the first containerized application includes a container function that is not included within the second set of selected container functions, the system cannot install the first containerized application on the second embedded device executing the second CRE. More specifically, the system can install a containerized application onto the embedded device via the CRE, wherein the containerized application includes a subset of container functions of a first set of selected container functions and of a second set of selected container functions; and install the first containerized application onto the second embedded device via the second containerized runtime environment. Thus, the system can install a containerized application on any CRE that supports the container functions included in the containerized application.

The system can also, in cooperation with a CRE running on an embedded device, install multiple containerized applications on a single embedded device and allocate memory to each containerized application installed on the embedded device in order to prevent overwriting or deadlocking when executing either containerized application. More specifically, the system can: allocate a first memory region on the embedded device for the first containerized application; grant the first containerized application exclusive write access to the first memory region; and grant the first containerized application read-only access to the set of libraries of the HAL. Concurrently, the system can allocate a second memory region on the embedded device for the second containerized application; grant the second containerized application exclusive write access to the second memory region; and grant the second containerized application read-only access to the set of libraries of the HAL.

In implementations in which the system installs the CRE and the HAL alongside existing firmware of the embedded device, the real-time operating system can cooperate with the CRE in order to allocate memory and computational resources to installed containerized applications. More specifically, the system can: allocate a protected memory region for a containerized application via the real-time operating system; and execute the containerized application within the protected memory region via the CRE and the HAL. Alternatively, the system can establish a protected memory region on the embedded device managed by the CRE that includes the entirety of the CRE and HAL and is managed via the CRE to enable installation of additional containerized applications.

12. Containerized Application Execution

Generally, once the system, in cooperation with the CRE and HAL has installed a containerized application on the embedded device, the system can, in cooperation with the CRE and HAL, execute the first containerized application via the CRE and the HAL in Block S170. Although each CRE and HAL are customized to the embedded device on which they are installed and customized to the particular container functions relevant to the user's desired application, each containerized application is predictably compatible with CREs and HALs that support the set of container functions utilized within the containerized application. Thus, a single containerized application (without modification) can be installed and executed on multiple different versions of the CRE and HAL. More specifically, a first embedded device can execute a first containerized application via a first CRE and a first HAL; and a second embedded device can execute the first containerized application via a second CRE and a second HAL.

Additionally, each embedded device executing a CRE and a HAL can concurrently execute multiple containerized applications based on a priority scheme implemented by a priority scheme module within the CRE. More specifically, the embedded device, via the CRE, can interrupt execution of a first containerized application to execute the second containerized application according to a priority scheme implemented by the CRE. Thus, the system can prioritize time-sensitive function calls within each containerized application and enable real-time functionality for data reporting, analysis, and feedback functionality.

In one implementation, the CRE executing on the embedded device can also implement a shared memory region within the memory of the embedded device and allocate this shared memory region based on current storage demands of each containerized application, thereby enabling flexible memory usage by containerized applications. In this implementation, the system can generate a CRE including a memory allocation module configured to flexibly allocate the shared memory region between a set of containerized applications.

In another implementation, the CRE executing on the embedded device can execute containerized applications (stored as bytecode in local memory of the embedded device) via a bytecode interpreter included within the CRE, thereby enabling user to write containerized applications using an interpreted programming language.

12.1 Data Sampling

In one implementation, a containerized application includes: a processing module configured to apply data analysis techniques to a measurement or a set of measurements sampled from the sensor and/or store measurements in local memory of the embedded device; and a control loop configured to coordinate sampling of data from the sensor, input of data to the processing module, and output of data over wired or wireless connections (e.g., to a gateway node). More specifically, the processing module can implement data processing and/or storage functions such as flagging and/or discarding anomalous data (e.g., anomaly detection according to an autoregressive-moving-average model), (weighted) averaging of data captured over a particular sampling period, and/or reading and writing data to local memory on an embedded device. Thus, the embedded device, via execution of the CRE and the HAL installed on the embedded device, can: interpret a first function call corresponding to a first function in the set of selected container functions, the first function configured to sample from a sensor of the embedded device; convert the first function call to a first set of instructions for the embedded device based on the input mapping; execute the first set of instructions to capture a first data sample via the sensor of the embedded device; and convert the first data sample to a first instance of the generalized data structure via the output mapping.

Generally, upon sampling data from a connected sensor, the embedded device executing the containerized application can also transmit these data over a network connected to a gateway or cloud-computing device. More specifically, the embedded device can execute a containerized application via the CRE and the HAL by: interpreting a function call corresponding to a function in the set of selected container functions, the function configured to transmit instances of the generalized data structure over a network; converting the function call to a set of instructions for the embedded device based on the input mapping; and executing the set of instructions to transmit an instance of the generalized data structure over the network. Thus, the system enables communication of data between embedded devices at the device edge and connected devices, while facilitating robustness to changes in these communication protocols via updates to the relevant containerized application executing with the CRE.

For example, a first containerized application, when executed by the CRE on the embedded device, can read a value from the sensor, store the value in local memory of the embedded device, map the sensor output from a first data structure into a second, generalized self-describing data structure, and output (e.g., over an encrypted wireless channel) the second data structure to a local gateway server. In this example, the first containerized application defines a very small memory and CPU footprint, enabling the device to store and execute additional containerized applications and/or store a more sophisticated CRE and/or HAL.

In another example, a second containerized application, when executed by the CRE on the embedded device, can sample a set of values (e.g., 100 values) over a particular sampling period, derive an exponentially weighted average of the set of values over the sampling period, and output the exponentially weighted average to a local gateway server (e.g., for each sampling period). In this example, the second containerized application defines a larger memory and CPU footprint, which may reduce the amount of memory on the embedded device available for the CRE and/or HAL.

In one implementation, the system receives input from a user specifying the type of sensor to sample, a type of data to be sampled from the sensor, and a sampling interval or sampling frequency at which data of this type is output by a device connected to the sensor. In response to these inputs and/or selections, the system can then automatically generate a containerized application that can be executed by the CRE on the embedded device to: identify a communication bus corresponding to the selected type of sensor; query the specified sensor at the specified sampling frequency using libraries and/or functions for the communications bus included in the HAL; populate a generalized self-describing data structure with data sampled from the specified sensor at each sampling interval; and output the self-describing data structure to a gateway server at the specified sampling frequency. The system therefore eliminates the need for development of specific applications (e.g., by a user) that correctly query each type of sensor over particular communication buses. Furthermore, the system enables development and execution of general applications against this data stream (e.g., to run analytics across data output by multiple different sensors) that need not be reconfigured according to different types of sensors and sensor outputs.

For example, the system can receive inputs and/or selections (e.g., by a user) specifying sampling of (x, y, z) position values from an ADXL 345 accelerometer (e.g., in a wearable medical device) at 25 millisecond intervals. In response to these selections, the system can: automatically generate a containerized application configured to query the ADXL 245 accelerometer over the correct communication buses (e.g., the I2C bus) every 25 milliseconds; populate an instance of a self-describing data structure with (x, y, z) position values sampled from the ADXL 345 every 25 milliseconds; and output a data stream including these self-describing data structures every 25 milliseconds to the system or a gateway node. The system can then execute a containerized application (e.g., a shock detection algorithm that sends an emergency SMS if a fall is detected) developed against this data structure rather than the direct output of the ADXL 345 itself, eliminating the need for the containerized application to directly query the sensor to obtain the desired data at the desired sampling frequency.

12.2 Machine Learning Classification and/or Inference Generation

In one implementation, via the CRE and HAL, the embedded device can execute a containerized application configured to execute machine learning classification and/or inference generation based on data sampled from a sensor and/or stored on local memory of the embedded device. More specifically, the embedded device can execute a containerized application via the CRE and the HAL by: interpreting a function call corresponding to a function in the set of selected container functions, the function configured to execute a machine learning model on instances of the generalized data structure; converting the function call to a set of instructions for the embedded device based on the input mapping; executing the set of instructions to generate an output of the machine learning model based on a first instance of the generalized data structure; and converting the output of the machine learning model to a second instance of the generalized data structure. Thus, the embedded device with the installed CRE and HAL can execute machine learning models on recently sampled data at the device edge without first communicating data to a gateway- or cloud-computing device.

For example, the system can install a containerized application configured to execute a long short-term memory recurrent neural network (hereinafter "LSTM network") on a set of input data sampled from a sensor connected to the embedded device. In this example, the embedded device can store (within a protected memory region allocated to the containerized application) a vector of data points within the generalized self-describing data structure and store a set of quantized weights for the recurrent neural network. The embedded device can then: execute the LSTM network on the vector of data points; and output a classification or other inference based on the vector of data points via available hardware accelerators on the embedded device. Thus, given sufficient computational and memory resources, the system can enable execution of complex machine learning models on embedded devices.

In addition to LSTM networks, the system can install containerized applications configured to execute other machine learning and/or statistical models such as linear/logistic regression, decision trees, support vector machines, nearest neighbor models and/or clustering algorithms, convolutional neural networks, etc. Thus, the system can enable complex classification by embedded devices, which can enable time-constrained decision making and feedback by these embedded devices at the device edge.

Additionally, due to the containerized nature of each containerized application, the system can securely update containerized applications with an updated machine learning model (e.g., a retrained set of weights or a more effective model) for execution by the embedded device. Furthermore, by facilitating deployment of containerized applications across a fleet of embedded devices characterized by a variety of different hardware configurations, the system can reduce or eliminate barriers to cross-platform data acquisition, thereby enabling more effective training of machine learning models for future deployment on embedded devices. For example, the system can install a containerized application configured for data reporting to a set of embedded devices, such that each embedded device reports data from a connected sensor within an identical self-describing data structure to a gateway device or cloud computing system. The gateway device or cloud computing system can then aggregate these data and train (or retrain) machine learning models based on these data and labelled outcomes or classifications associated with these data.

12.3 Feedback Computation

In addition to performing on device data analysis and reporting, the system can install containerized applications configured to output feedback in real-time to various actuators connected to the embedded device. For example, the system can install a containerized application configured to digitally execute a PID control algorithm and, therefore, this containerized application can: sample data collected from a sensor; calculate a feedback control signal based on these data; and output the feedback control signal to a connected actuator over a communication bus. In another example, the system can install a containerized application configured to execute a classification model (as described above) by, in response to detecting a particular state based on input data sampled from a sensor, transmitting a signal to a connected actuator. Thus, the system can install a containerized application configured to perform essential control functions in real-time and at the device edge (e.g., without communicating over a network), while also enabling frequent and secure options to update these feedback control functions.

More specifically, the embedded device can execute, via the CRE and the HAL, a containerized application by: interpreting a function call corresponding to a function in the set of selected container functions, the function configured to generate feedback outputs for transmission via an output bus of the embedded device based on instances of the generalized data structure; converting the function call to a set of instructions for the embedded device based on the input mapping; and executing the second set of instructions to generate a feedback output based on the first instance of the generalized data structure and transmit the feedback output via the output bus of the embedded device.

12.4 Status Reporting

Generally, the system can install, and the embedded device can execute, containerized applications configured to report a device status to a gateway or other connected device in order to facilitate sitewide monitoring across a set of embedded devices. More specifically, the embedded device can execute a containerized application via the CRE and the HAL by: interpreting a function call corresponding to a function in the set of selected container functions, the function configured to execute a status check on the embedded device; converting the function call to a set of instructions for the embedded device based on the input mapping; executing the set of instructions to generate an operational status of the embedded device; and converting the operational status of the embedded device to an instance of the generalized data structure via the output mapping.

In one implementation, the system can install a lightweight (in terms of computer and memory resources) CRE that executes a containerized application configured to generate a status report for the embedded device. In this implementation, the system can install the CRE and the single containerized application onto the embedded device while maintaining the existing firmware and/or real-time operating system of the embedded device. Thus, in this implementation, the CRE executing on the embedded device reports (in the generalized self-describing data structure) on the performance of the embedded device in meeting guaranteed timings via the embedded devices existing firmware.

13. Container Updates

Generally, the system can install instances of the CRE configured to execute updates to containerized applications running on the embedded device and/or updates to the CRE itself. More specifically, the system can generate a CRE: configured to execute, at the embedded device, a containerized application via the HAL; and including an installation module configured to install and update the containerized application. The system can then, install the first containerized application onto the embedded device via the installation module of the CRE; and the embedded device can, in response to receiving instructions to update the containerized application, update the first containerized application via the installation module of the CRE. Thus, the system can obviate the need for manual firmware updates for most functions of the embedded device performed by the containerized application, thereby increasing the flexibility of embedded devices deployed in the field by increasing the security and ease with which these embedded devices can be updated by the system.

In one implementation, the system can install an instance of the CRE configured to check for updates to the existing firmware installed on the embedded device and execute these updates. In this implementation, the system can install the CRE as native code executing on a real-time operating system of the embedded device. In this implementation the CRE can run in the background during operation of the embedded device and check for updates to the firmware of the embedded device on a predefined schedule or frequency. Upon detecting that an update is available for the embedded device the system can prompt the embedded device to reboot for installation of the firmware update. Thus, the CRE can function as a lightweight system for updating existing (non-containerized) firmware on embedded devices with insufficient computational and/or memory overhead for installation of full containerized applications.

In another implementation, the system can install an even more lightweight version of the CRE configured to execute only at boot time of the embedded device. In this implementation, during a boot cycle of the embedded device, the CRE can check for updates to the embedded device (e.g., by communicating over a network or by check I/O ports on the embedded device for a locally available update). In response to detecting that an update is available for the embedded device, the CRE can interrupt the boot cycle of the embedded device and initiate a secure update to the firmware of the embedded device. Thus, the system can install an extremely small implementation of the CRE (e.g., characterized by a few kilobytes of memory overhead) that can securely execute updates to the existing firmware of the embedded device, thereby enabling more frequent and secure updates to the embedded device at boot time, without interrupting any potentially time sensitive functions of the embedded device.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:
1. A method comprising:
   accessing a set of hardware parameters characterizing an embedded device;
   identifying a set of supported container functions based on the set of hardware parameters;
   accessing a selection of container functions;
   identifying a set of selected container functions based on the selection of container functions and the set of supported container functions;
   generating a hardware abstraction layer comprising:
      a set of libraries supporting the set of selected container functions;
      an input mapping from the set of selected container functions to native instructions executable by the embedded device; and
      an output mapping from data structures generated by the embedded device to a generalized data structure;
   generating a container runtime environment configured to execute, at the embedded device, a first containerized application via the hardware abstraction layer, the first containerized application comprising the set of selected container functions;
   installing the hardware abstraction layer and the container runtime environment onto the embedded device;
   installing the first containerized application onto the embedded device via the container runtime environment by:

executing a firmware update on the embedded device to install a container operating system executing the container runtime environment on the embedded device;
allocating a protected memory region on the embedded device via the container runtime environment; and
storing the set of libraries, the input mapping, and the output mapping in the protected memory region; and
at the embedded device, executing the first containerized application via the container runtime environment and the hardware abstraction layer.

2. The method of claim 1, wherein, installing the first containerized application onto the embedded device via the container runtime environment comprises, via the container runtime environment:
allocating a first memory region on the embedded device for the first containerized application;
granting the first containerized application exclusive write access to the first memory region; and
granting the first containerized application read-only access to the set of libraries of the hardware abstraction layer.

3. The method of claim 2, further comprising installing a second containerized application onto the embedded device by:
allocating a second memory region on the embedded device for the second containerized application;
granting the second containerized application exclusive write access to the second memory region; and
granting the second containerized application read-only access to the set of libraries of the hardware abstraction layer.

4. The method of claim 3, further comprising interrupting execution of the first containerized application to execute the second containerized application according to a priority scheme implemented by the container runtime environment.

5. The method of claim 1:
wherein generating the container runtime environment comprises generating the container runtime environment:
configured to execute, at the embedded device, the first containerized application via the hardware abstraction layer; and
comprising an installation module configured to install and update the first containerized application;
wherein installing the first containerized application onto the embedded device via the container runtime environment comprises installing the first containerized application onto the embedded device via the installation module of the container runtime environment; and
further comprising, at the embedded device:
receiving instructions to update the first containerized application; and
updating the first containerized application via the installation module of the container runtime environment.

6. The method of claim 1, wherein at the embedded device, executing the first containerized application via the container runtime environment and the hardware abstraction layer comprises:
interpreting a first function call corresponding to a first function in the set of selected container functions, the first function configured to sample from a sensor of the embedded device;
converting the first function call to a first set of instructions for the embedded device based on the input mapping;
executing the first set of instructions to capture a first data sample via the sensor of the embedded device; and
converting the first data sample to a first instance of the generalized data structure via the output mapping.

7. The method of claim 6, wherein at the embedded device, executing the first containerized application via the container runtime environment and the hardware abstraction layer further comprises:
interpreting a second function call corresponding to a second function in the set of selected container functions, the second function configured to execute a machine learning model on instances of the generalized data structure;
converting the second function call to a second set of instructions for the embedded device based on the input mapping;
executing the second set of instructions to generate an output of the machine learning model based on the first instance of the generalized data structure; and
converting the output of the machine learning model to a second instance of the generalized data structure.

8. The method of claim 6, wherein at the embedded device, executing the first containerized application via the container runtime environment and the hardware abstraction layer further comprises:
interpreting a second function call corresponding to a second function in the set of selected container functions, the second function configured to generate feedback outputs for transmission via an output bus of the embedded device based on instances of the generalized data structure;
converting the second function call to a second set of instructions for the embedded device based on the input mapping; and
executing the second set of instructions to:
generate a feedback output based on the first instance of the generalized data structure; and
transmit the feedback output via the output bus of the embedded device.

9. The method of claim 6, wherein, at the embedded device, executing the first containerized application via the container runtime environment and the hardware abstraction layer further comprises:
interpreting a second function call corresponding to a second function in the set of selected container functions, the second function configured to transmit instances of the generalized data structure over a network;
converting the second function call to a second set of instructions for the embedded device based on the input mapping; and
executing the second set of instructions to transmit the first instance of the generalized data structure over the network.

10. The method of claim 1, wherein at the embedded device, executing the first containerized application via the container runtime environment and the hardware abstraction layer comprises:
interpreting a first function call corresponding to a first function in the set of selected container functions, the first function configured to execute a status check on the embedded device;
converting the first function call to a first set of instructions for the embedded device based on the input mapping;
executing the first set of instructions to generate an operational status of the embedded device; and converting the operational status of the embedded device to a first instance of the generalized data structure via the output mapping.

11. The method of claim 1:
wherein generating the container runtime environment configured to execute, at the embedded device, the first containerized application via the hardware abstraction layer comprises generating the container runtime environment configured to execute, at the embedded device, the first containerized application via the hardware abstraction layer, the first containerized application:
comprising the set of selected container functions; and
represented as a first compiled bytecode file; and
wherein, at the embedded device, executing the first containerized application via the container runtime environment and the hardware abstraction layer comprises, at the embedded device:
interpreting the first compiled bytecode file via the container runtime environment to convert the first compiled bytecode file to a first set of instructions executable on the embedded device; and
executing the first set of instructions.

12. The method of claim 1, wherein the hardware abstraction layer and the container runtime environment are characterized by a memory footprint of less than 256 kilobytes on the embedded device.

13. The method of claim 1, wherein accessing the set of hardware parameters characterizing the embedded device comprises accessing the set of hardware parameters selected from a group of hardware parameters comprising:
a central processing unit type of the embedded device;
an available memory of the embedded device;
a memory type of the embedded device;
an input bus type of the embedded device;
an output bus type of the embedded device;
a sensor type associated with the embedded device;
a hardware accelerator type of the embedded device; and
a network connectivity of the embedded device.

14. A method comprising:
accessing a set of hardware parameters characterizing an embedded device;
identifying a set of supported container functions based on the set of hardware parameters;
accessing a selection of container functions;
identifying a set of selected container functions based on the selection of container functions and the set of supported container functions;
generating a hardware abstraction layer comprising:
a set of libraries supporting the set of selected container functions;
an input mapping from the set of selected container functions to native instructions executable by the embedded device; and
an output mapping from data structures generated by the embedded device to a generalized data structure;
generating a container runtime environment configured to execute, at the embedded device, a first containerized application via the hardware abstraction layer, the first containerized application comprising the set of selected container functions;
installing the hardware abstraction layer and the container runtime environment onto the embedded device;
installing the first containerized application onto the embedded device via the container runtime environment; and
at the embedded device, executing the first containerized application via the container runtime environment and the hardware abstraction layer by:
interpreting a first function call corresponding to a first function in the set of selected container functions, the first function configured to sample from a sensor of the embedded device;
converting the first function call to a first set of instructions for the embedded device based on the input mapping;
executing the first set of instructions to capture a first data sample via the sensor of the embedded device; and
converting the first data sample to a first instance of the generalized data structure via the output mapping.

15. A method comprising:
accessing a set of hardware parameters characterizing an embedded device;
identifying a set of supported container functions based on the set of hardware parameters;
accessing a selection of container functions;
identifying a set of selected container functions based on the selection of container functions and the set of supported container functions;
generating a hardware abstraction layer comprising:
a set of libraries supporting the set of selected container functions;
an input mapping from the set of selected container functions to native instructions executable by the embedded device; and
an output mapping from data structures generated by the embedded device to a generalized data structure;
generating a container runtime environment configured to execute, at the embedded device, a first containerized application via the hardware abstraction layer, the first containerized application comprising the set of selected container functions;
installing the hardware abstraction layer and the container runtime environment onto the embedded device;
installing the first containerized application onto the embedded device via the container runtime environment; and
at the embedded device, executing the first containerized application via the container runtime environment and the hardware abstraction layer by:
interpreting a first function call corresponding to a first function in the set of selected container functions, the first function configured to execute a status check on the embedded device;
converting the first function call to a first set of instructions for the embedded device based on the input mapping;
executing the first set of instructions to generate an operational status of the embedded device; and
converting the operational status of the embedded device to a first instance of the generalized data structure via the output mapping.

16. A method comprising:
accessing a set of hardware parameters characterizing an embedded device;
identifying a set of supported container functions based on the set of hardware parameters;
accessing a selection of container functions;
identifying a set of selected container functions based on the selection of container functions and the set of supported container functions;
generating a hardware abstraction layer comprising:

a set of libraries supporting the set of selected container functions;

an input mapping from the set of selected container functions to native instructions executable by the embedded device; and an output mapping from data structures generated by the embedded device to a generalized data structure;

generating a container runtime environment configured to execute, at the embedded device, a first containerized application via the hardware abstraction layer, the first containerized application comprising the set of selected container functions;

installing the hardware abstraction layer and the container runtime environment onto the embedded device by:

executing a firmware update on the embedded device to install the container runtime environment as native code executing on a real-time operating system of the embedded device; and storing the set of libraries, the input mapping, and the output mapping in a protected memory region allocated to the container runtime environment by the real-time operating system;

installing the first containerized application onto the embedded device via the container runtime environment; and at the embedded device, executing the first containerized application via the container runtime environment and the hardware abstraction layer.

17. The method of claim 16, wherein at the embedded device, executing the first containerized application via the container runtime environment and the hardware abstraction layer comprises:

allocating a second protected memory region for the first containerized application via the real-time operating system; and executing the first containerized application within the second protected memory region via the container runtime environment and the hardware abstraction layer.

18. A method comprising:

accessing a set of hardware parameters characterizing an embedded device;

identifying a set of supported container functions based on the set of hardware parameters;

accessing a selection of container functions;

identifying a set of selected container functions based on the selection of container functions and the set of supported container functions;

generating a hardware abstraction layer comprising:

a set of libraries supporting the set of selected container functions;

an input mapping from the set of selected container functions to native instructions executable by the embedded device; and an output mapping from data structures generated by the embedded device to a generalized data structure;

generating a container runtime environment configured to execute, at the embedded device, a first containerized application via the hardware abstraction layer, the first containerized application comprising the set of selected container functions;

installing the hardware abstraction layer and the container runtime environment onto the embedded device, the hardware abstraction layer and the container runtime environment characterized by a memory footprint of less than 256 kilobytes on the embedded device;

installing the first containerized application onto the embedded device via the container runtime environment; and at the embedded device, executing the first containerized application via the container runtime environment and the hardware abstraction layer.

19. The method of claim 18, wherein installing the hardware abstraction layer and the container runtime environment onto the embedded device comprises:

executing a firmware update on the embedded device to install the container runtime environment as native code executing on a real-time operating system of the embedded device; and storing the set of libraries, the input mapping, and the output mapping in a protected memory region allocated to the container runtime environment by the real-time operating system.

20. The method of claim 18, wherein installing the hardware abstraction layer and the container runtime environment onto the embedded device comprises:

executing a firmware update on the embedded device to install a container operating system executing the container runtime environment on the embedded device;

allocating a protected memory region on the embedded device via the container runtime environment; and storing the set of libraries, the input mapping, and the output mapping in the protected memory region.

* * * * *